(12) United States Patent
Backer et al.

(10) Patent No.: US 10,518,468 B2
(45) Date of Patent: *Dec. 31, 2019

(54) SURFACE MODIFICATION OF SILICONES

(71) Applicant: Dow Corning Corporation, Midland, MI (US)

(72) Inventors: Michael Backer, Mainz (DE); Hans Peter Wolf, Liederbach (DE)

(73) Assignee: Dow Silicones Corporation, Midland, MI (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/566,454

(22) PCT Filed: Apr. 14, 2016

(86) PCT No.: PCT/EP2016/058241
§ 371 (c)(1),
(2) Date: Oct. 13, 2017

(87) PCT Pub. No.: WO2016/166224
PCT Pub. Date: Oct. 20, 2016

(65) Prior Publication Data
US 2018/0100267 A1    Apr. 12, 2018

(30) Foreign Application Priority Data
Apr. 16, 2015  (GB) .................................. 1506589.9

(51) Int. Cl.
| *B29C 59/16* | (2006.01) |
| *C08J 7/12* | (2006.01) |
| *C08L 83/00* | (2006.01) |
| *D06N 3/00* | (2006.01) |
| *D06N 3/12* | (2006.01) |
| *B60R 21/235* | (2006.01) |
| *B64D 17/02* | (2006.01) |
| *D06M 10/10* | (2006.01) |
| *D06M 15/356* | (2006.01) |
| *D06M 15/715* | (2006.01) |

(52) U.S. Cl.
CPC ............ *B29C 59/16* (2013.01); *B60R 21/235* (2013.01); *B64D 17/02* (2013.01); *C08J 7/123* (2013.01); *C08L 83/00* (2013.01); *D06M 10/10* (2013.01); *D06M 15/3568* (2013.01); *D06M 15/715* (2013.01); *D06N 3/0006* (2013.01); *D06N 3/0036* (2013.01); *D06N 3/0059* (2013.01); *D06N 3/0081* (2013.01); *D06N 3/128* (2013.01); *B29C 2791/006* (2013.01); *B60R 2021/23514* (2013.01); *B60R 2021/23533* (2013.01); *D06N 2209/108* (2013.01); *D06N 2211/00* (2013.01); *D06N 2211/268* (2013.01)

(58) Field of Classification Search
CPC .. C08K 83/00; C08J 7/123; C08J 3/28; B29C 2791/006
See application file for complete search history.

(56) References Cited

U.S. PATENT DOCUMENTS

| 5,827,160 A | 10/1998 | Ohki et al. |
| 2005/0205829 A1 | 9/2005 | Magd et al. |
| 2006/0276585 A1 | 12/2006 | Lork |
| 2009/0298367 A1 | 12/2009 | Lafaysse et al. |
| 2010/0304133 A1 | 12/2010 | Maeda |
| 2013/0037207 A1 | 2/2013 | Yamamoto |
| 2018/0104889 A1* | 4/2018 | Backer ................. D06N 3/0081 |

FOREIGN PATENT DOCUMENTS

| FR | 2862990 A1 | 6/2005 |
| JP | H04202846 A | 7/1992 |
| JP | H04359032 A | 12/1992 |
| JP | H07238177 A | 9/1995 |
| JP | H07282687 A | 10/1995 |
| JP | H07296669 A | 11/1995 |
| JP | H08276435 A | 10/1996 |
| JP | H09250539 A | 9/1997 |
| JP | H09296114 A | 11/1997 |
| JP | H1037073 A | 2/1998 |
| JP | 2000212441 A | 8/2000 |
| JP | 2006342350 A | 12/2006 |
| JP | 2007023220 A | 2/2007 |
| WO | WO2016030183 A1 | 3/2016 |

OTHER PUBLICATIONS

PCT/EP2016/058241 International Search Report dated Jul. 13, 2016, 3 pages.
P. Swiderek et al in Macromol. Mater. Eng., "Modification of Polydimethysiloxane Coatings by H2 RF Plasma, XE2* Excimer VUV Radiation, and Low-Energy Beams", 2012, 297, 1091-1101 (Macromolecular Materials and Engineering).
K. Efimenko et al, "Surface Modification of Sylgard-184 Poly(dimethyl siloxane) Networks by Ultraviolet and Ultraviolet/Ozone Treatment", in J. Colloid and Interface Science 254, 306-315 (2002).
Vera-Maria Graubner et al.: "Photochemical modification of crosslinked poly(dimethylsiloxane) by irradiation at 172 nm", Macromolecules, vol. 37, 2004, pp. 5936-5943.
V.N. Vasilets, et al. : "Improvement of the micro-wear resistance of silicone by vacuum ultraviolet irradiation", Polymer, vol. 39, No. 13, 1997 pp. 2875-2881.
J.A. Dever et al.: "Vacuum ultraviolet radiation effects on DC-93-500 silicone film", Journal of Spacecraft and Rockets, Mar. 2006 (Mar. 2006), pp. 123-140.

(Continued)

Primary Examiner — Sanza L. McClendon
(74) Attorney, Agent, or Firm — Warner Norcross + Judd LLP

(57) ABSTRACT

A process for modifying a silicone elastomeric-based surface of a textile article where the coefficient of friction (COF) of the silicone elastomeric-based surface is generally reduced by at least 5% is disclosed. The process comprises subjecting the silicone elastomeric-based surface of the textile article to vacuum ultraviolet (UV) radiation.

12 Claims, No Drawings

(56) References Cited

OTHER PUBLICATIONS

B. Schnyder et al.: "UV-irradiation induced modification of PDMS films investigated by XPS and spectroscopic ellipsometry" Surface Science, Jun. 2003 (Jun. 2003), pp. 1067-1071.
PCT/EP2016/058245 International Search Report dated Jul. 13, 2016, 5 pages.
English language abstract and machine translation for WO2016030183 (A1) extracted from http://worldwide.espacenet.com database on Oct. 18, 2017, 32 pages.
English language abstract and machine translation for JPH04359032 (A) extracted from http://worldwide.espacenet.com database on Sep. 25, 2018, 10 pages.
English language abstract and machine translation for JPH07238177 (A) extracted from http://worldwide.espacenet.com database on Sep. 25, 2018, 10 pages.
English language abstract and machine translation for JPH07282687 (A) extracted from http://worldwide.espacenet.com database on Sep. 25, 2018, 15 pages.
English language abstract and machine translation for JPH07296669 (A) extracted from http://worldwide.espacenet.com database on Sep. 25, 2018, 13 pages.
English language abstract and machine translation for JPH08276435 (A) extracted from http://worldwide.espacenet.com database on Sep. 25, 2018, 13 pages.
English language abstract and machine translation for JPH09296114 (A) extracted from http://worldwide.espacenet.com database on Sep. 25, 2018, 22 pages.
English language abstract and machine translation for JP2000212441 (A) extracted from http://worldwide.espacenet.com database on Sep. 25, 2018, 11 pages.
English language abstract and machine translation for JP2007023220 (A) extracted from http://worldwide.espacenet.com database on Sep. 25, 2018, 23 pages.
English language abstract and machine translation for JPH04202846 (A) extracted from http://worldwide.espacenet.com database on Sep. 25, 2018, 6 pages.
English language abstract and machine translation for JP10-037073 (A) extracted from http://www.j-platpat.inpit.go.jp database on Sep. 25, 2018, 4 pages.

\* cited by examiner

SURFACE MODIFICATION OF SILICONES

CROSS-REFERENCE TO RELATED APPLICATIONS

This application is the National Stage of International Application No. PCT/EP2016/058241 filed on 14 Apr. 2016, which claims priority to and all advantages of GB Patent Application No. 1506589.9 filed on 16 Apr. 2015, the content of which is hereby incorporated by reference.

This invention relates to modifying the surface of a silicone article and to silicone articles having a modified surface. In particular we have found that the surface of a silicone article can be modified to reduce the coefficient of friction of the silicone surface. Silicones, for example silicone elastomers, are resilient, impact resistant, mouldable and resistant to heat, moisture and chemicals. Silicone elastomers may be electrically insulating. In some instances, silicone elastomers may be used for the manufacture of moulded articles such as casings. Moulded silicone elastomers have a surface which is soft but tend to pick up dust and may even be tacky. For uses such as casings for electronic devices, for example hand held electronic devices, the silicone elastomer surface has generally been coated or covered with a harder plastics material.

US-A-2013/0037207 describes a method for adhering a hard silicone resin and a substrate, the method comprising the steps of: applying excitation treatment to a surface of a hard silicone resin; juxtaposing and pressurizing the surface and a substrate; and adhering the hard silicone resin and the substrate.

US-A-2010/304133 describes a method for producing a transparent resin plate in which a resin substrate is covered with a hard-coat layer, comprising: forming said hard-coat layer out of silicone polymer by a wet method; irradiating a region of the hard-coat layer with vacuum ultraviolet rays from an ultraviolet light source, wherein the vacuum ultraviolet layers have a wavelength less than 200 nm, and wherein only said region is reformed, by exposure to the irradiation, into a hardened film mainly composed of silicon dioxide.

K. Efimenko et al in J. Colloid and Interface Science 254, 306-315 (2002) describe surface modification of a polydimethylsiloxane (PDMS) elastomer by UV and UV/ozone treatment, for use for example in soft lithography.

V-M. Graubner et al in Macromolecules 2004, 37, 5936-5943 describe photochemical modification of crosslinked PDMS by irradiation at 172 nm. Irradiation results in a large increase in surface free energy and surface oxidation of the polymer.

P. Swiderek et al in Macromol. Mater. Eng. 2012, 297, 1091-1101, describe crosslinking of thin liquid PDMS layers by $H_2$ radio frequency plasma treatment, by $Xe_2$ excimer VUV irradiation and by low energy electron beam.

A process according to the present invention for modifying a silicone elastomeric based surface of an article is characterised in that the coefficient of friction of the silicone surface is reduced by at least 5% by subjecting the article to vacuum ultraviolet (VUV) radiation.

The invention includes an article having a silicone elastomeric based surface, which surface is modified by the above process and having a reduction of coefficient of friction reduced by at least 5%. Typically, the article is a textile or fabric article.

Examples of textile article or fabric article include airbags, parachute, outdoor textile (tents, coats, bags).

Examples of fabric or textile material include natural and synthetic textile materials and fibers. Examples of fabric or textile material include wool, cotton, bamboo, cellulose, nylon, polyester, polyamide, acrylonitrile, fiberglass, polyurethane, polylactide, polyethylene, polypropylene, and mixtures thereof. The textile may be a reinforced textile article such as silicone elastomer reinforced textile.

The surface modification by the present process does not alter the silicone elastomeric properties of the elastomeric coating of the final silicone elastomer coated textile article.

Ultraviolet (UV) light is an electromagnetic radiation with a wavelength from 400 nm to 10 nm, shorter than that of visible light but longer than X-rays. By vacuum ultraviolet (or VUV) radiation we mean radiation of wavelength 120 to 200 nm.

The vacuum ultraviolet treatment according to the invention preferably takes place after any curing reaction of the silicone elastomer or of the silicone elastomer based composition, and after the silicone elastomer or the silicone elastomer based composition has been shaped by moulding or coating. The vacuum ultraviolet treatment can advantageously be a post-treatment of a finished article produced from a silicone elastomer or from a silicone elastomer based composition.

Silicone elastomers may be prepared by curing an alkenyl-functional organopolysiloxane and a Si—H functional organopolysiloxane. The alkenyl-functional organopolysiloxane and the Si—H functional organopolysiloxane can be cured in the presence of a hydrosilylation catalyst or in the presence of a peroxide catalyst.

The alkenyl-functional organopolysiloxane generally has at least two alkenyl groups per molecule, for example vinyl, hexenyl, allyl, butenyl, pentenyl, or heptenyl groups. Silicon-bonded organic groups in the alkenyl-functional organopolysiloxane other than the alkenyl groups may be exemplified by methyl, ethyl, propyl, butyl, pentyl, hexyl, or similar alkyl groups; or phenyl, tolyl, xylyl, or similar aryl groups; or hydroxyalkyl groups such as $HOCH_2CH_2$— or groups derived from ethylene glycol or propylene glycol such as $HOCH_2CH_2O(CH_2)_3$— or $HOCH_2CH(CH_3)O(CH_2)_3$—. All or part of the alkenyl-functional organopolysiloxane may have a predominantly linear molecular structure and can for example comprise an α,ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units. The alkenyl-functional organopolysiloxane can optionally additionally comprise a branched organopolysiloxane containing alkenyl units.

The Si—H functional organopolysiloxane generally has at least two, and preferably has at least 3, Si-bonded hydrogen atoms per molecule. It can for example be a low molecular weight organosilicon resin or a short or long chain organosiloxane polymer, which may be linear or cyclic. The Si—H functional organopolysiloxane may for example have the general formula

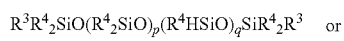 or

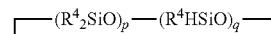

wherein $R^4$ denotes an alkyl or aryl group having up to 10 carbon atoms, and $R^3$ denotes a group $R^4$ or a hydrogen atom, p has a value of from 0 to 20, and q has a value of from 1 to 70, and there are at least 2 or 3 silicon-bonded hydrogen atoms present per molecule. $R^4$ can for example be a lower alkyl group having 1 to 3 carbon atoms, such as a methyl group. Examples of suitable Si—H functional organopolysiloxanes include trimethylsiloxane end-blocked polymethylhydrosiloxanes, dimethylhydrosiloxane end-blocked methylhydro siloxane, dimethylsiloxane methylhydrosiloxane copolymers and tetramethylcyclotetrasiloxane. A mixture of more than one of these materials can be used.

The molar ratio of Si—H groups in the organopolysiloxane (B) to aliphatically unsaturated groups in the organopolysiloxane (A) is preferably at least 1:1 and can be up to 8:1 or 10:1. For example the molar ratio of Si—H groups to aliphatically unsaturated groups is in the range from 1.3:1 to 5:1.

The hydrosilylation catalyst (C) is preferably a platinum group metal (Group VIII of the Periodic Table) or a compound thereof. Platinum and/or platinum compounds are preferred, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

Further examples of hydrosilylation catalysts include cobalt complexes containing terdentate pyridine di-imine ligands such as $(^{Mes}PDI)CoN_2$ and $(^{Mes}PDI)CoCH_3$; and metal terpyridine complexes such as bis(trimethylsilyl)iron (II)terpyridine.

A silicone elastomer can be prepared from the alkenyl-functional organopolysiloxane and Si—H functional organopolysiloxane by curing in the presence of the hydrosilylation catalyst typically at a temperature in the range 20 to 200° C., alternatively 50 to 190° C., alternatively 80 to 190° C. Curing can for example take place in a mould to form a moulded silicone article. The composition comprising the alkenyl-functional organopolysiloxane, the Si—H functional organopolysiloxane and the catalyst can for example be injection moulded to form an article, or the composition can be overmoulded by injection moulding around an article.

Examples of peroxide catalysts include benzoyl peroxide, 4-monochlorobenzoyl peroxide, dicumyl peroxide, tert-butyl peroxybenzoate, tert-butylcumyl peroxide, tert-butyloxide, 2,5-dimethyl-2,5-di-tert-butylperoxyhexane, 2,4-dichlorobenzoyl peroxide, di-t-butylperoxydiisopropylbenzene, 1,1-bis(t-butylperoxy)-3,3,5-trimethylcyclohexane, 2,5-di-tert-butylperoxyhexane-3,2,5-dimethyl-2,5-bis(tert-butylperoxy) hexane, or cumyl-tert-butylperoxide. These catalysts can be used individually or in combinations of two or more.

A silicone elastomer can be prepared from the alkenyl-functional organopolysiloxane and Si—H functional organopolysiloxane by curing in the presence of the peroxide catalyst at a temperature in the range 50 to 200° C. Curing can for example take place in a mould to form a moulded silicone article by injection moulding or overmoulding.

An alternative type of silicone elastomer which benefits from surface modification according to the invention is a high consistency elastomer comprising a polyorganosiloxane gum having a viscosity of 1000 Pa.s or more at 25° C. Unless otherwise indicated all viscosity values given herein were measured at 25° C. The polyorganosiloxane gum can for example have terminal silanol groups and be cured with a peroxide catalyst or can have alkenyl terminal groups and be cured by a Si—H functional organopolysiloxane and a hydrosilylation catalyst. High consistency elastomers are generally too stiff to be injection moulded but can be moulded and cured by compression moulding, for example at a temperature in the range.

The silicone elastomer composition can contain a filler or can be unfilled. The filler can be a reinforcing filler such as silica or modified silica. Suitable other fillers include ground quartz, ground cured silicone rubber particles, carbon black, glass microspheres and calcium carbonate. The amount of filler can for example be up to 75% by weight of the silicone elastomer composition.

The silicone elastomer composition may further comprise a silane, for example an organofunctional silane or organofunctional siloxane oligomer. Examples of organofunctional groups which can usefully be present in the silane include olefinically unsaturated groups such as alkenyl groups, for example vinyl, allyl, 1-propenyl, isopropenyl, or hexenyl groups, or acrylate or methacrylate groups. Examples of suitable unsaturated silanes include 3-methacryloylpropyl trimethoxysilane, 3-methacryloylpropyl triethoxysilane, vinyltrimethoxysilane or vinyltriethoxysilane.

The silicone elastomer composition may comprise other additives known in the art. Such additives include but are not limited to pigments, adhesion promoters, curing retarders, extender fillers, heat resistance improvers, heat stabilizers, flame retardants, inhibitors, chain extenders, plasticisers, electrically conductive fillers, thermally conductive fillers. Further additives include dyes, rheological modifiers, fungicides, biocides, UV stabilizers, water scavengers, Examples of pigments include iron oxide, colcothar, titanium dioxide, zinc oxide, carbon black.

Examples of adhesion promoters include organic titanium compounds such as organic titanic acid esters; metal chelate compounds such as a titanium chelate compound, an aluminum chelate compound, and a zirconium chelate compound; alkoxysilanes such as aminoalkylalkoxy silanes, mercapto-alkylalkoxy silanes, epoxy group-containing organoalkoxysilanes, acryloxy group-containing organoalkoxysilane, and methacryloxy group-containing organoalkoxysilanes; and organopolysiloxanes containing an epoxy group, an alkenyl group and an alkoxy group in one molecule; isocyanurates containing silicon groups such as 1,3,5-tris(trialkoxysilylalkyl) isocyanurates; reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Examples of curing retarders include acetylene compounds such as 1-ethynyl-1-cyclohexanol, 2-methyl-3-butyn-2-ol, 3,5-dimethyl-1-hexyn-3-ol, 3,5-dimethyl-1-octyn-3-ol and 2-phenyl-3-butyn-2-ol; enyne compounds such as 3-methyl-3-penten-1-yne and 3,5-dimethyl-3-hexen-1-yne; triazoles such as benzotriazole; phosphines; mercaptanes; and hydrazines.

Examples of extender fillers include quartz powder, diatomaceous earth, calcium carbonate, magnesium carbonate.

Examples of heat resistance improvers include cerium oxide, cerium hydroxide, iron oxide, carbon black, iron carboxylate salts, cerium hydrate, titania, barium zirconate, cerium octoates, zirconium octoates, and porphyrins.

Examples of flame retardants include carbon black, aluminum trihydrate, hydrated aluminium hydroxide, silicates such as wollastonite, platinum and platinum compounds.

Examples of chain extenders include SiH-endcapped polydimethylsiloxane.

Examples of plasticisers include unreactive short chain siloxanes such as polydimethylsiloxane having terminal triorganosiloxy groups wherein the organic substituents are, for example, methyl, vinyl or phenyl or combinations of these groups, generally having a viscosity of from about 5 to about 100,000 mPa.s; dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids. Further examples of plasticisers include mineral oil fractions comprising linear (n-paraffinic) mineral oils, branched (iso-paraffinic) mineral oils and/or cyclic (naphthenic) mineral oils, mineral oil fractions comprising linear (n-paraffinic) mineral oils, branched (iso-paraffinic) mineral oils and/or cyclic (naphthenic) mineral oils.

Examples of electrically conductive fillers include carbon black, metal particles such as silver particles, metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Examples of thermally conductive fillers include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Silicone elastomers may be characterized by their hardness (DIN 53505 Shore A), by their tensile strength and elongation at break (DIN 53504-S1), and their tear-propagation resistance (ASTM D624B).

Various methods may be used to expose surfaces to VUV radiation.

Vacuum ultraviolet irradiation can be performed inside a vessel which is evacuated or which is filled with an inert gas such as argon, helium, xenon, neon or nitrogen. Vacuum ultraviolet irradiation may be performed in ambient conditions, but may also be performed in oxygen controlled atmosphere, typically with a level of oxygen below 2%. Vacuum ultraviolet irradiation can for example be performed at atmospheric pressure in an atmosphere of nitrogen containing 1% oxygen by weight. The source of vacuum ultraviolet irradiation can for example be a $Xe_2$*excimer lamp emitting incoherent light at a wavelength of 172 nm corresponding to a photon energy of 7.2 eV and spectral bandwidth of 14 nm. An example of such a lamp is Xeradex® vacuum ultraviolet Excimer Lamp supplied by Osram GmbH. The distance between the lamp outer rim and the silicone surface can for example be from 1 to 30 cm. The irradiation energy density can for example be between 20 and 200 $J.cm^{-2}$. The irradiation duration can for example be 1 to 2000 seconds.

As an example, irradiation by VUV light may be performed as follows: inside a vessel filled with an inert gas at atmospheric pressure with an $O_2$ admixture of 1%. A $Xe^2$ excimer lamp (Xeradex® VUV excimer Lamp; Osram GmbH) emitting incoherent light at a wavelength of 172 nm corresponding to a photon energy of 7.2 eV and spectral bandwidth of 14 nm may be used as radiation source. The irradiation energy density between 104 and 46 $J.cm^{-2}$ may be varied by changing the distance between the lamp outer rim and sample surface from 1 to 30mm. The irradiation duration may be of 900 s.

An alternative source of vacuum ultraviolet radiation is BlueLight high power Excimer systems from Heraeus Noblelight GmbH. These are doped mercury/amalgam lamps available with various peak spectral lines, for example 185 nm and 254 nm.

Excimer lamps exist of different kinds emitting over the spectra of 120 to 240 nm, such as $Ar_2$*, $Kr_2$*, $Xe_2$* emitting at 126, 146, 172 nm respectively. For example, the 172 nm radiation of a $Xe_2$ dielectric barrier discharge may be used to remove polymers, activate surface bonds, adjust wetting angles, induce metallization and chemical vapor deposition (CVD) and directly dissociate molecular oxygen.

Another method includes a 30-W deuterium lamp facility. The average intensity of the 30-W deuterium lamp was approximately 2.2 equivalent Suns ($2.4 \times 10-5$ $W/cm^2$); the intensity of the lamp naturally drops off at 200 nm; and exposures were done at a vacuum pressure $<10^{-5}$ torr (where 1 torr=133,322 Pa), with 54 cm between the lamp and the center of the sample plate which was perpendicular to the beam. The VUV lamp radiation passed through a magnesium fluoride end-window which provided a lower cut-off wavelength of 115 nm. A cesium iodide (CsI) phototube was used to measure the lamp's intensity.

A further method includes an atomic oxygen (AO) facility which produces VUV radiation (with a peak intensity at 130 nm) with an $MgF_2$ lens to block AO. The dose of VUV radiation in the AO facility may be qualitative, with more time in the facility defined as "more" radiation. The AO facility uses a radio frequency power supply to create an oscillating electrical potential between two plates in the presence of a partial pressure of air, thereby generating oxygen-rich plasma. Molecules of $O_2$ are broken to produce atomic oxygen, and the movement of electrons between energy levels in excited oxygen atoms produces VUV radiation. Specimens to receive only VUV in the AO facility were placed in a protective fixture with an $MgF_2$ lens covering the top mating surface of the specimen. These $MgF_2$ lenses are transparent to VUV. By covering specimens with $MgF_2$ and protecting them from AO, one may determine if the VUV present affects the surface properties of the silicone elastomeric based article.

Yet another method comprises an exposure of vacuum ultraviolet light between 200 $mJ/cm^2$ and 1500 $mJ/cm^2$. Typically, the wavelength of the exposure vacuum ultraviolet light may be 172 nm. Examples of apparatus include vacuum ultraviolet exposure apparatus UVS-1000SM, from USHIO INC.

The irradiation may be carried out in a static or moving mode, such as on a conveyor belt.

The vacuum ultraviolet radiation generally reduces the coefficient of friction of the silicone elastomeric based surface by at least 5%, alternatively by at least 10%, alternatively by at least 15%, alternatively by at least 30%, alternatively by at least 50%.

The dynamic coefficient of friction of the cured coating may be measured according to DIN 53357:1986-11 test method, potentially with a modification using a 200 g sledge.

The coefficient of friction may be measured according to ISO8295:1995(E) standard, providing for both static and dynamic coefficient of friction.

The coefficient of friction may be measured according to ASTM D1894-01 standard, Standard Test Method for Static and Kinetic Coefficients of Friction of Plastic Film and Sheeting, providing for both static and dynamic coefficient of friction. The methods by ASTM D1894-01 and ISO8295: 1995 are not technically equivalent.

The coefficient of friction may be determined as follows: crosslinked silicone elastomer foils (80×30 mm) of thickness 2 mm are fastened to a metal slider using a weight of 190 g and a contact area of 24 cm$^2$, and drawn at a velocity of 100 cm/min over a steel plate. The coefficient of friction μ is calculated from the following formula: μ=frictional force/weight.

The vacuum ultraviolet radiation also modifies the feel of the silicone surface when it is handled or held; the surface is perceived as less sticky or less tacky.

The vacuum ultraviolet radiation only modifies or affects a thin layer at the upper surface of the silicone elastomeric based material. The depth or thickness of the modified surface layer of the silicone elastomeric based material is generally less than 1 mm thick, alternatively less than 500 nm thick, alternatively less than 100 nm thick, alternatively less than 800 nm thick, alternatively less than 50 nm thick, alternatively less than 10 nm thick. The bulk properties of the silicone elastomeric based material, such as the flexibility and tensile and flexural strength, elongation at break, transparency, are not substantially altered by the vacuum ultraviolet radiation. The vacuum ultraviolet radiation reduces the coefficient of friction of the silicone elastomeric based surface and improves the surface feel of the article without modifying bulk physical properties of the silicone elastomer article such as flexibility or impact strength.

The surface modification of the silicone elastomeric based material is permanent in time, that is, it does not disappear with time and does not wear off upon use. By permanent, it is meant that the surface modification will last at least as long as the article is in use. This permanent effect of the surface modification of the silicone elastomeric based material is advantageous over other methods to treat surfaces, such as plasma treatment.

In a further application, the automotive industry uses silicone elastomer compositions as fabric coatings for air bags. Subjecting the air bag or the coated fabric to vacuum ultraviolet radiation according to the invention reduces the coefficient of friction of the silicone elastomeric based surface so that the air bag opens more readily when inflated. The vacuum ultraviolet radiation treatment does not negatively affect the gas barrier properties of the coated air bag or the pressure retention of the air bag. Additional benefits may include ease of folding, space saving compared to hard topcoat, heat shield.

Silicone elastomeric compositions generally have high resistance to impact, to heat, to water, to solvents and to chemicals.

The present invention also provides for the use of vacuum ultraviolet radiation to reduce the coefficient of friction of the silicone elastomeric based surface of a silicone elastomer coated textile article by at least 5%.

The present invention further provides for the use of a textile article treated by the process described above as an airbag or parachute or outdoor textile.

EXAMPLES

A 5 litre volume, one piece woven airbag, composed of 420 Denier polyester fibre was coated with commercial Dow Corning® LCF 3760 at 60 +/−5 grams per square meter on each side and cured for 1 minute at 190 C in a forced air oven.

Irradiation of the test zones was carried out using a low pressure mercury lamp (wavelength 185 nm and 254 nm) of type Heraeus Noblelight, Soluva 4.20 VUV Modul (UV Intensity 140 mW/cm2, for a wave length of 254 nm, at distance of 10 mm; providing for an irradiation area of 230×140 mm), for 2 minutes.

Evaluation of the test zones was carried out with respect to airbag deployment (inflation duration-ASTM D6476), flex abrasion (ISO 5981), and coefficient of friction (ISO 8295). Test results are given in Table 1 below.

TABLE 1

| Irradiation condition | Deployment (kPa; time to 50% of peak pressure) | Flex Abrasion (Strokes; cycles) | Coefficient of Friction (Static/Dynamic) |
|---|---|---|---|
| Control-no irradiation | 7.5 seconds | >1000 | 5.8/6.3 |
| Treated zone, 2 minutes irradiation | 4.5 seconds | >1000 | 3.3/3.8 |

Irradiation is shown to affect the airbags at the level of friction coefficient, reducing said parameter of more than 10%. Further, air permeation and fold resistance was shown to remain equivalent to that of the non-irradiated airbag pieces.

The invention claimed is:

1. A process for modifying a silicone elastomeric-based surface of a textile article, said process comprising:
    subjecting the silicone elastomeric-based surface of the textile article to vacuum ultraviolet radiation;
    wherein the vacuum ultraviolet radiation is performed using a low-pressure mercury lamp; and
    wherein the coefficient of friction of the silicone elastomeric-based surface is reduced by at least 5%.

2. The process according to claim 1, wherein the silicone elastomeric-based surface of the textile article consists of silicone elastomer.

3. The process according to claim 2, wherein the silicone elastomer is the reaction product of a hydrosilylation or peroxide cure of an alkenyl-functional organopolysiloxane and a Si—H functional organopolysiloxane.

4. The process according to claim 1, wherein the textile article is an airbag.

5. The process according to claim 1, wherein the textile article is a silicone elastomer coated airbag.

6. The process according to claim 1, wherein the textile article is coated, and is subsequently subjected to vacuum ultraviolet radiation.

7. The process according to claim 1, wherein the vacuum ultraviolet radiation is performed on a conveyor belt.

8. A textile article having a silicone elastomeric-based surface, which surface is modified by the process according to claim 1.

9. The textile article according to claim 8, wherein the silicone elastomeric-based surface has a modified surface layer of less than 1 mm in thickness.

10. An airbag formed by the process according to claim 1.

11. A parachute formed by the process according to claim 1.

12. An outdoor textile formed by the process according to claim 1.

* * * * *